US012293597B2

(12) United States Patent
Katayama (10) Patent No.: US 12,293,597 B2
(45) Date of Patent: May 6, 2025

(54) CHARACTER INPUT DEVICE, CHARACTER INPUT METHOD, AND NON-TRANSITORY COMPUTER-READABLE STORAGE MEDIUM STORING A CHARACTER INPUT PROGRAM FOR OBTAINING A FIRST CHARACTER STRING, EXTRACTING SIMILAR CHARACTERS AND GENERATING SECOND CHARACTER STRING WITH REPLACEMENT CHARACTERS AND OUTPUTTING CONVERSION CANDIDATES (71) Applicant: OMRON Corporation, Kyoto (JP)

(72) Inventor: Takeshi Katayama, Kyoto (JP)

(73) Assignee: OMRON Corporation, Kyoto (JP)

( * ) Notice: Subject to any disclaimer, the term of this patent is extended or adjusted under 35 U.S.C. 154(b) by 354 days.

(21) Appl. No.: 17/555,580

(22) Filed: Dec. 20, 2021

(65) Prior Publication Data
US 2022/0215681 A1 Jul. 7, 2022

(30) Foreign Application Priority Data
Jan. 7, 2021 (JP) ................. 2021-001193

(51) Int. Cl.
*G09B 7/08* (2006.01)
*G06F 3/023* (2006.01)
(Continued)

(52) U.S. Cl.
CPC .......... *G06V 30/133* (2022.01); *G06F 3/0233* (2013.01); *G06V 30/153* (2022.01); *G06V 30/28* (2022.01); *G09B 7/02* (2013.01)

(58) Field of Classification Search
CPC .... G06V 30/133; G06V 30/153; G06V 30/26; G06V 30/28; G06F 16/3329;
(Continued)

(56) References Cited

U.S. PATENT DOCUMENTS

2008/0115046 A1* 5/2008 Yamaguchi ............. G06F 40/53
715/201
2010/0174529 A1* 7/2010 Bradford ............. G06F 16/3344
704/10
2017/0339169 A1 11/2017 Wallace, III

FOREIGN PATENT DOCUMENTS

CN 104077062 A 10/2014
CN 105608462 A 5/2016
(Continued)

OTHER PUBLICATIONS

"Development of an Automatic Generation System of Incorrect Answer Choices Using Wrong Answers of a Written Question". Authors: Ryousuke Sugawara, Masanori Takagi. Information educational symposium collected-papers Information processing society of Japan symposium series vol. 2013 No. 2. (Year: 2013)*
(Continued)

*Primary Examiner* — Chad Dickerson
(74) *Attorney, Agent, or Firm* — METROLEX IP LAW GROUP, PLLC; Robert L. Scott, Esq.

(57) ABSTRACT

A first character string obtainment unit according to one or more embodiments may obtain a first character string in response to an input character string that has been input. A similar character extraction unit extracts similar characters having similar shapes as characters in the first character string. A second character string generation unit generates one or more second character strings in which some or all of the characters in the first character string are replaced with similar characters extracted by the similar character extraction unit. Then, a conversion candidate output unit outputs the first character string and the second character strings as conversion candidates for the input character string.

18 Claims, 5 Drawing Sheets

(51) Int. Cl.
*G06V 30/12* (2022.01)
*G06V 30/148* (2022.01)
*G06V 30/28* (2022.01)
*G09B 7/02* (2006.01)
*G06V 30/10* (2022.01)

(58) Field of Classification Search
CPC .... G06F 16/0233; G06F 40/40; G06F 40/242; G06F 40/129; G10L 15/005
USPC .......................................................... 704/2, 8
See application file for complete search history.

(56) References Cited

FOREIGN PATENT DOCUMENTS

| | | | |
|---|---|---|---|
| JP | H6-348688 A | | 12/1994 |
| JP | H7-105201 A | | 4/1995 |
| JP | 2004-227089 A | | 8/2004 |
| JP | 2005331650 A | * | 12/2005 |
| JP | 2011-81024 A | | 4/2011 |

OTHER PUBLICATIONS

The extended European search report (EESR) issued on Jun. 3, 2022 in a counterpart European Patent application.
The Office Action (JPOA) issued on Aug. 6, 2024 in a counterpart Japanese patent application No. 2021-001193, with English translation.
Office Action (CNOA) issued on Jan. 18, 2025 in a counterpart Chinese patent application No. 202111569307.X.

* cited by examiner

CHARACTER INPUT DEVICE, CHARACTER INPUT METHOD, AND NON-TRANSITORY COMPUTER-READABLE STORAGE MEDIUM STORING A CHARACTER INPUT PROGRAM FOR OBTAINING A FIRST CHARACTER STRING, EXTRACTING SIMILAR CHARACTERS AND GENERATING SECOND CHARACTER STRING WITH REPLACEMENT CHARACTERS AND OUTPUTTING CONVERSION CANDIDATES

CROSS-REFERENCES TO RELATED APPLICATIONS

This application claims priority to Japanese Patent Application No. 2021-001193 filed Jan. 7, 2021, the entire contents of which are incorporated herein by reference.

FIELD

The disclosure relates to a technique for determining and evaluating a user's academic or other ability and the like using a computer.

BACKGROUND

Computer based testing (CBT) in which a test is conducted using a computer for determining and evaluating knowledge, ability, and the like of a user (examinee) has been widely used. In CBT, a question is displayed on a display of a terminal (computer). The user operates input devices, such as a mouse and a keyboard provided at the terminal, to answer a question displayed on the display.

JP 2011-81024A discloses a system for performing a writing test conducted using a CBT method with a tablet terminal that can receive handwriting input.

JP 2011-81024A is an example of background art.

SUMMARY

However, when conducting a writing test using a CBT method, a handwriting input device is required for a user to input characters by handwriting.

Also, depending on the recognition accuracy of characters handwritten by a user, the correct answer may be determined as an incorrect answer, or conversely, an incorrect answer may be determined as the correct answer. When the correct answer is 豊臣秀吉 if ("Toyotomi Hideyoshi" in Chinese characters), for example, even if the characters handwritten by the user are correct, the character 臣 (pronounced: "tomi") may be recognized as the character 巨 (pronounced: "kyo"), and may be determined to be an incorrect answer. In contrast, even if the characters handwritten by the user is 豊口秀占 (transcription: "Toyokyo Hideyoshi"), which is an incorrect answer, the character 巨 may be erroneously recognized as the character 臣, and determined to be the correct answer. If a character handwritten by a user is misrecognized, the user's knowledge, ability, and the like cannot be properly determined and evaluated.

In addition, when a writing test is conducted using a CBT method, if the writing test is conducted using a known conversion function from kana (Japanese kana syllabograms) to kanji (Chinese characters), the above-described problem does not occur. However, if the kana character string is とよとみひでよし (transcription: "Toyotomi Hideyoshi"), which was input by the user as the reading, 豊臣秀吉 is output as a conversion candidate, but 豊口秀占 is not output. Accordingly, even a user who incorrectly remembers the Chinese character notation of とよとみひでよし as 豊口秀占 will select 豊臣秀吉 as an answer. Therefore, when a writing test is conducted using a CBT method, even if a known kana-to-kanji conversion function is used, determination and evaluation of user's knowledge, ability, and the like may not be performed as appropriate.

One or more embodiments may provide a technique capable of appropriately determining and evaluating knowledge, ability, and the like of a user who takes the test, when a writing test is conducted using a CBT method.

A character input device according to one or more embodiments may be configured as follows.

A first character string obtainment unit obtains a first character string, in response to an input character string that has been input. A similar character extraction unit extracts similar characters having similar shapes as characters in the first character string. A second character string generation unit generates one or more second character strings in which some or all of the characters in the first character string are replaced with similar characters extracted by the similar character extraction unit. Then, a conversion candidate output unit outputs the first character string and the second character strings as conversion candidates for the input character string.

In the above-described configuration, a first character string and a second character string are output as conversion candidates; the first character string is a character string whose reading is a kana character string (input character string) that is input by a user who takes a test of computer based testing (CBT) by operating a keyboard and the like, and the second character string is a character string obtained by replacing a part of characters in the first character string with characters similar in shape to the part of characters. The reading of the second character string may or may not be a kana character string input by a user. If the input character string that is input by the user is とよとみひでよし (transcription: "Toyotomi Hideyoshi"), for example, several conversion candidates are output, such as 豊臣秀吉 which is the correct answer, 豊巨秀吉 (transcription: "Toyokyo Hideyoshi"), 豊臣莠吉 (transcription: "Toyotomi Yuyoshi"), 豊臣禿吉 (transcription: "Toyotomi Hageyoshi"), 豊巨禿吉 (transcription: "Toyokyo Hageyoshi"), and 豊巨莠吉 (transcription: "Toyokyo Yuyoshi"). In the above-described example, 豊臣秀吉 is the first character string, and, 豊巨秀吉, 豊臣莠吉, 豊臣禿吉, 豊巨禿吉, and 豊巨莠吉 are the second character strings.

Accordingly, if the user incorrectly remembers the Chinese character notation of the input kana character string (reading), the user may select the correct conversion candidate (the first character string) by chance, but in most cases, the user will select an erroneous conversion candidate (the second character string). Therefore, in a case where the writing test is conducted using a CBT method, it is possible to appropriately determine and evaluate the knowledge, ability, and the like of a user who takes the test.

Furthermore, in the above-described configuration, because a user who takes the test of a CBT does not perform handwriting input, it is not necessary to provide a handwriting input device.

In addition, for example, the character input device may include an arrangement adjustment unit configured to adjust an arrangement order of the first character string and the second character strings that are output from the conversion candidate output unit as the conversion candidates for the input character string. With the above-described configuration, the position of the correct answer in the output conversion candidates may be changed for each question, and the user's knowledge, ability, and the like may be determined and evaluated more appropriately.

The first character string obtainment unit may be configured to obtain a predetermined character string as the first character string if the input character string is a specified character string, and to obtain a character string whose reading is the same as that of the input character string as the first character string if the input character string is not the specified character string.

When the input character string input by the user is not とよとみひでよし, which is the correct answer, but おだのぶなが (transcription: "Oda Nobunaga"), which is an incorrect answer, the first character string obtainment unit obtains 織山 信長 ("Oda Nobunaga" in Chinese characters) as the first character string. In the above-described case, as the second character strings, 職川信長 (transcription: "Shokuda Nobunaga"), 職田佶長 (transcription: "Shokuda Kitsunaga"), 織田佶長 (transcription: "Oda Kitsunaga"), 織川伸長 (transcription: "Oda Kurumanaga"), 職田伸長 (transcription: "Shokuda Kurumanaga"), and the like are generated. Accordingly, in the above-described configuration, the user is not aware that the answer he/she has input, that is to say, おだのぶなが is an incorrect answer. As a result, the user's knowledge, ability, and the like may be determined and evaluated more appropriately.

The character input device may include a grading unit configured to grade, as an answer, a conversion candidate selected from the conversion candidates that have been output from the conversion candidate output unit.

According to one or more embodiments, in a case where a writing test is conducted using the computer based testing (CBT) method, it may be possible to appropriately determine and evaluate the knowledge, ability, and the like of a user who takes the test.

DETAILED DESCRIPTION

Hereinafter, one or more embodiments will be described.

1. Application Example

Figure 1:
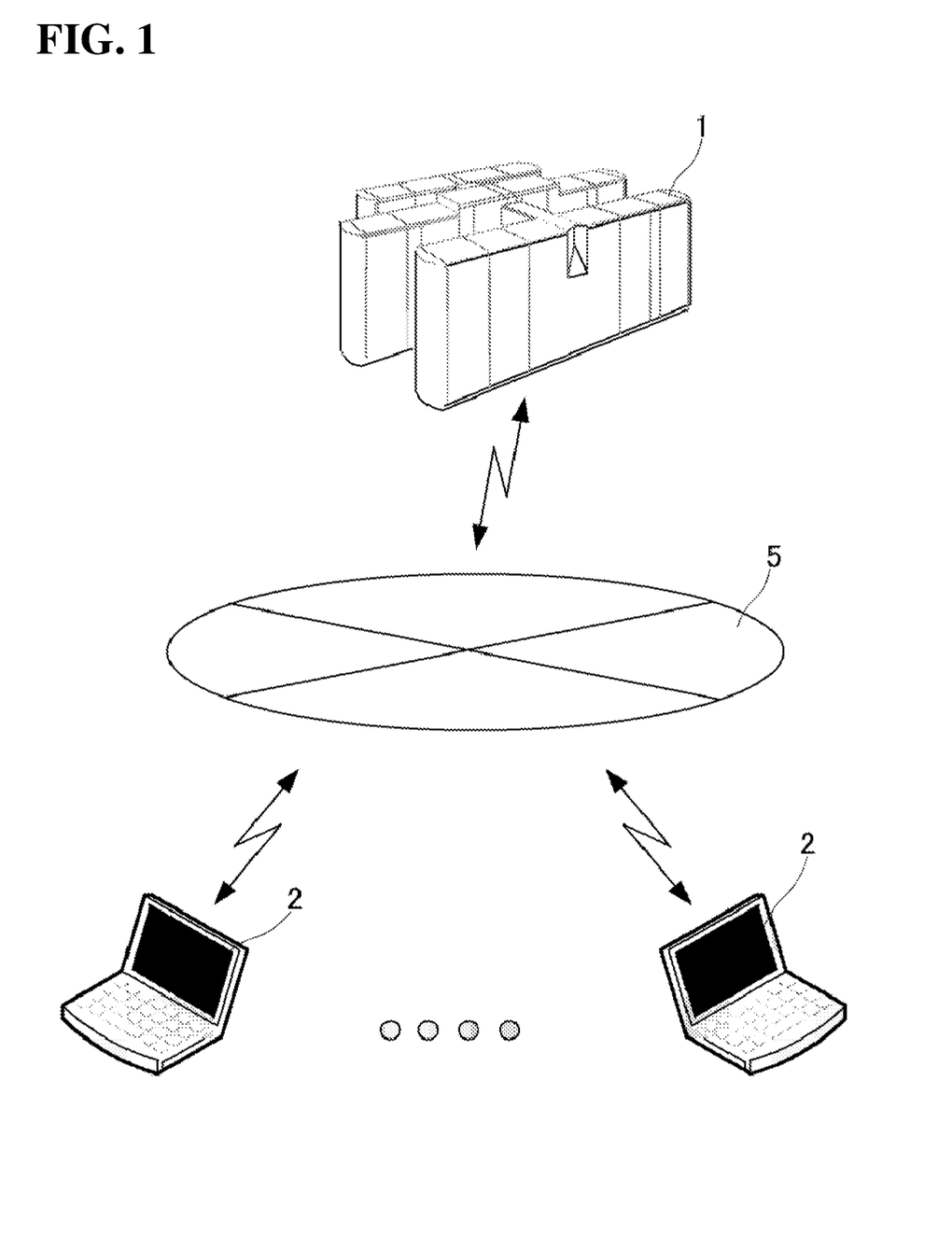
FIG. 1 is a schematic diagram illustrating a network system for conducting computer based testing (CBT) in a writing test in accordance with one or more embodiments.

FIG. 1 is a schematic diagram showing a network system for performing computer based testing (CBT) in a writing test. As shown in FIG. 1, the network system of the present example has a configuration in which a plurality of user terminals 2 are connected to a server device 1 via a network 5 and capable of data communication.

The user terminal 2 is a personal computer or a tablet terminal operated by a user who takes a CBT writing test. The server device 1 distributes a question or questions of a writing test conducted using a CBT method to the user terminal 2, and grades an answer or answers transmitted from the user terminal 2.

In the present example, a character input device according to one or more embodiments is used as the server device 1.

The server device 1 distributes one or more questions of a writing test conducted using a CBT method to the user terminal 2.

The user terminal 2 displays the question or questions distributed from the server device 1 on a screen of a display of the user terminal 2. The user inputs an answer to the question or questions by operating a keyboard serving as an input device. In the present case, the user inputs an answer in the form of a kana (i.e., Japanese character) string.

The server device 1 distributes the following question to the user terminal 2, for example.

Whose personality is described in the following Japanese tanka (short poem of seventeen kana characters)?

「鳴かぬなら鳴かせ てみせようホトトギス」

(English translation: "If the small cuckoo does not sing for me, I will make the small cuckoo sing.", a famous Japanese tanka in seventeen kana characters; "Na-ka-nu-na-ra, na-ka-se-te-mi-se-yo, ho-to-to-gi-su")

A user who takes the test inputs a kana character string such as とよとみ ひでよし (transcription: "Toyotomi Hideyoshi") or おだのぶなが (transcription: "Oda Nobunaga") to the user terminal 2. The user terminal 2 outputs the input kana character string to the server device 1.

The server device 1 generates conversion candidates, according to the kana character string received from the user terminal 2. The server device 1 returns the generated conversion candidates to the user terminal 2. When the kana character string received from the user terminal 2 is "とよとみひでよし," for example, the server device 1 generates conversion candidates such as "豊臣秀吉," "豊巨秀吉," "豊臣芳吉," "豊臣禿吉," "豊巨禿吉," and "豊巨芳吉." The correct answer to the question is the character string: "豊臣秀吉." The character string "豊臣秀吉," corresponds to a first character string according to one or more embodiments. The kana character strings: 豊巨秀吉, 豊臣芳吉, 豊臣禿吉, 豊巨 禿吉, and 豊臣秀吉 are conversion candidates obtained by replacing some characters of the correct answer 豊臣秀吉 if with characters having similar shapes. The kana character strings: 豊巨秀吉, 豊臣芳吉, 豊臣禿吉, 豊巨禿吉, and 豊巨芳吉 correspond to second character strings according to one or more embodiments.

The server device 1 may also create a conversion candidate in which all the characters of the correct answer 豊臣秀吉 are replaced with characters having similar shapes.

If the kana character string received from the user terminal 2 is おだのぶ なが ("Oda Nobunaga"), the server device 1 returns, to the user terminal 2, as conversion candidates, 織田信長, 職田信長, 歳田佶長, 織田佶長, 職田佶長, 織田佶長 伸長, and the like. Although 織田信長 is not the correct answer to the question, 織田信長 is a conversion candidate whose reading is the character string input by the user. Accordingly, 織田信長 corresponds to a first character string according to one or more embodiments.

The kana character strings: 歳田佶長, 職田佶長, 織田佶長, 織田伸長, 職 田伸長, and the like are conversion candidates obtained by replacing some characters of 織田信長 with characters having similar shapes. The kana character strings: 職田信長, 職山佶長, 織山佶長, 織田伸長, 職田伸長, and the like correspond to the second character strings according to one or more embodiments.

The user terminal 2 displays the conversion candidates returned from the server device 1 on the screen of the display of the user terminal 2. The user operates a mouse or a keyboard serving as an input device to select his/her answer from the displayed conversion candidates. The user terminal 2 outputs, to the server device 1, the conversion candidate selected by the user as the answer of the user.

The server device 1 grades whether the user's answer to the question is the correct answer or an incorrect answer for each user terminal 2 (that is to say, for each user).

As described above, in the network system, if the user incorrectly remembers the Chinese character notation of the input kana character string (reading), the user may select the correct conversion candidate by chance, but in most cases, the user will select an erroneous conversion candidate. Therefore, when the writing test is conducted using a CBT method, it is possible to appropriately determine and evaluate the knowledge, ability, and the like of a user who takes the test.

In addition, in the above-described network system, because the user does not input an answer by handwriting, the user's knowledge, ability, and the like are not erroneously determined and evaluated depending on the recognition accuracy of the characters input by handwriting. Furthermore, the user does not need to prepare a tablet that can receive handwriting input.

2. Configuration Example

Figure 2:
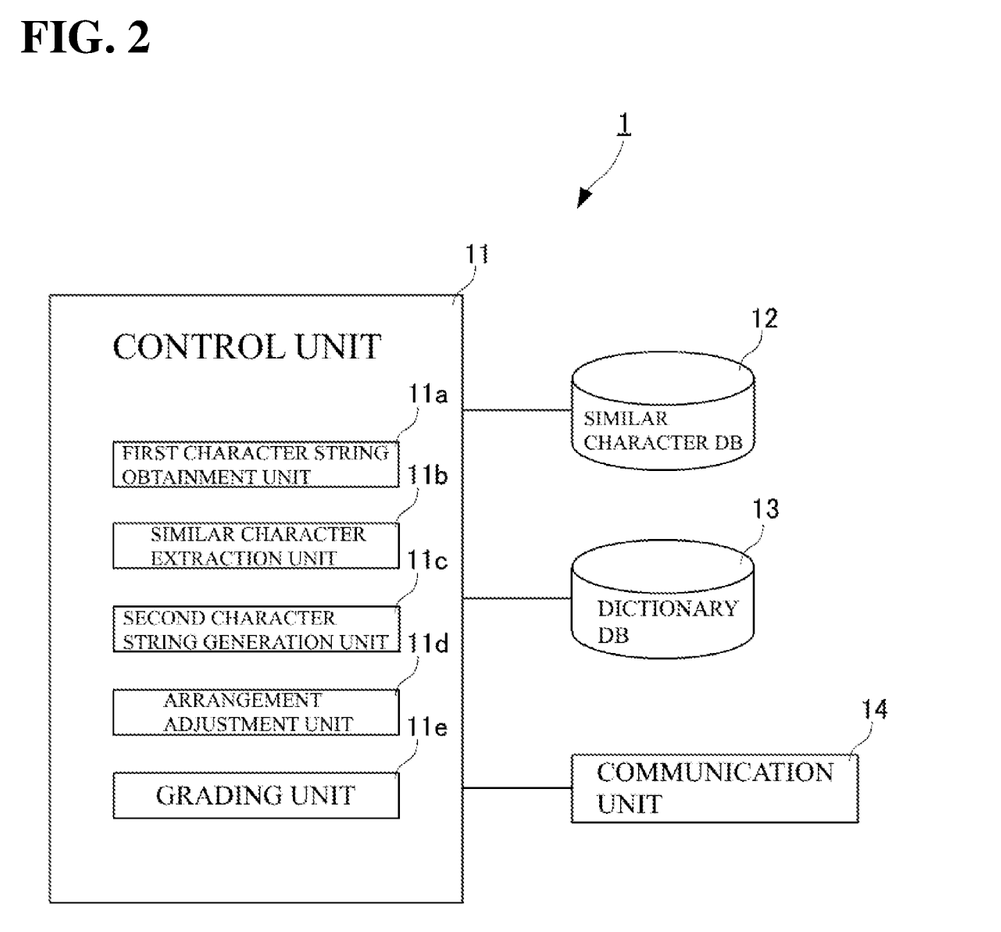
FIG. 2 is a block diagram illustrating a configuration of a main parts of a server device in accordance with one or more embodiments.

FIG. 2 is a block diagram showing a configuration of the main parts of the server device 1 in the present example. The server device 1 includes a control unit 11, a similar character database 12 (similar character DB12), a dictionary database 13 (dictionary DB13), and a communication unit 14.

The control unit 11 controls the units of the main body of the server device 1. In addition, the control unit 11 includes a first character string obtainment unit 11a, a similar character extraction unit 11b, a second character string generation unit 11c, an arrangement adjustment unit 11d, and a grading unit 11e. The first character string obtainment unit 11a, the similar character extraction unit 11b, the second character string generation unit 11c, the arrangement adjustment unit 11d, and the grading unit 11e that are included in the control unit 11 will be described later.

The similar character DB12 is a database in which characters having similar shapes are grouped and stored. The similar character DB12 is, for example, a database in which character groups (groups of characters having similar feature amounts of shapes) extracted as candidates are grouped and stored for a certain character recognized in character recognition by a known optical character reader (OCR). The dictionary DB13 is a database in which readings (kana character notation), parts of speech, converted character strings (Chinese character notation), and the like are registered in association with one another. The communication unit 14 performs data communication with the user terminals 2 connected via the network 5.

The similar character DB12 and the dictionary DB13 may be, for example, hard disk drives (HDDs), solid state drives (SSDs), or other storage media. Furthermore, the similar character DB12 and the dictionary DB13 may be configured by dividing a storage area in a single storage medium, or may also be configured by different storage media.

Next, the first character string obtainment unit 11a, the similar character extraction unit 11b, the second character string generation unit 11c, the arrangement adjustment unit 11d, and the grading unit 11e that are included in the control unit 11 will be described.

The first character string obtainment unit 11a obtains conversion candidates whose reading is the kana character string received from the user terminal 2. If the kana character string received from the user terminal 2 is the reading of the correct answer to the question, the first character string obtainment unit 11a obtains the Chinese character notation of the correct answer to the question as the first character string. If the kana character string received from the user terminal 2 is not the reading of the correct answer to the question, the first character string obtainment unit 11a obtains, as the first character strings, conversion candidates whose reading is the received kana character string.

For each of the characters belonging to the first character string obtained by the first character string obtainment unit 11a, the similar character extraction unit 11b extracts a character or characters similar in shape to that character. The similar character extraction unit 11b extracts characters having similar shapes by looking them up in the similar character DB12.

The second character string generation unit generates, as the second character string, a character string obtained by replacing some or all of the characters belonging to the first character string obtained by the first character string obtainment unit 11a with the characters extracted by the similar character extraction unit 11b. The second character string generation unit generates one or more second character strings.

The arrangement adjustment unit 11d adjusts the arrangement order of the first character string obtained by the first character string obtainment unit 11a and the second character strings generated by the second character string generation unit 11c when the first and second character strings are displayed as conversion candidates on the user terminal 2.

The grading unit 11e performs grading including correctness of the answer, based on the conversion candidate selected at the user terminal 2.

The control unit 11 of the server device 1 includes a hardware CPU, a memory, and other electronic circuits. When the hardware CPU executes the character input program according to one or more embodiments, the hardware CPU operates as the first character string obtainment unit 11a, the similar character extraction unit 11b, the second character string generation unit 11c, the arrangement adjustment unit 11d, and the grading unit 11e. The memory has an area for developing the character input program according to one or more embodiments, and an area for temporarily storing data and the like generated during execution of the character input program. The control unit 11 may also be an LSI in which the hardware CPU, the memory, and the like are integrated. The hardware CPU is a computer for executing the character input method according to one or more embodiments.

Figure 3:
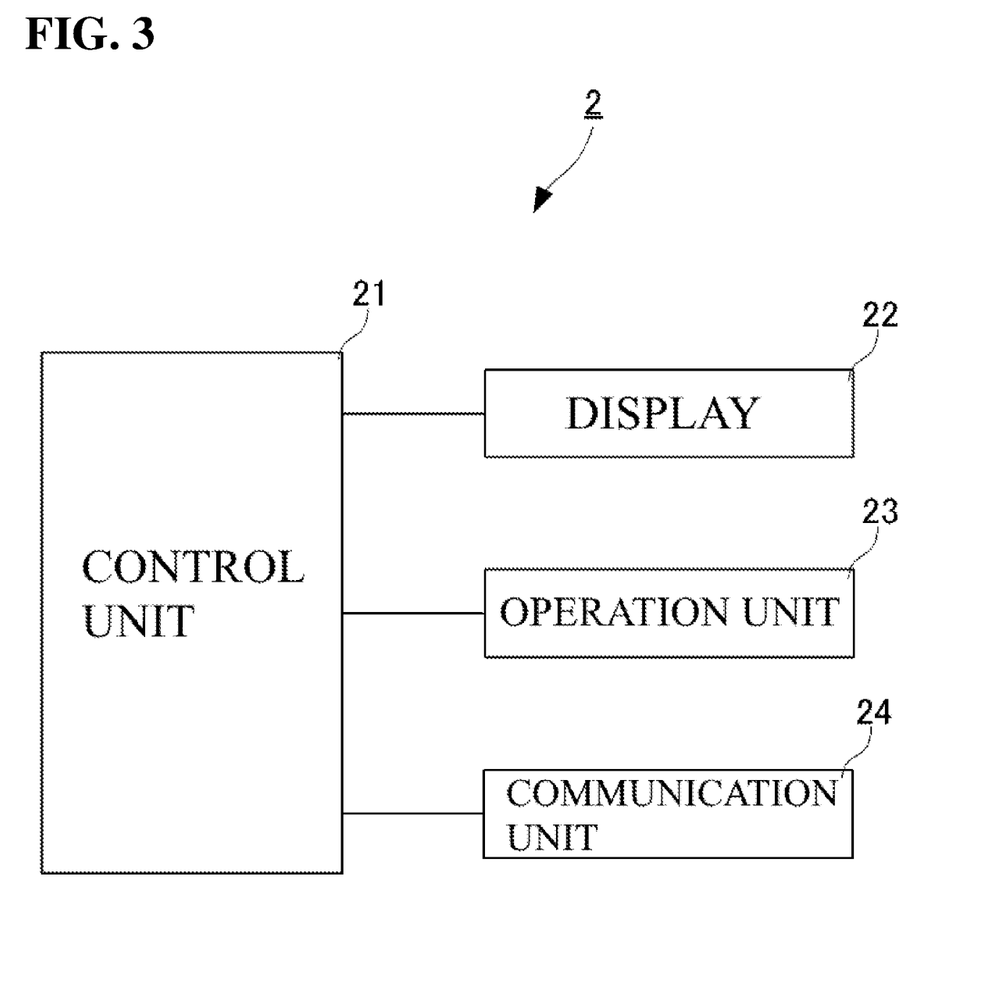
FIG. 3 is a block diagram illustrating a configuration of a main parts of a user terminal in accordance with one or more embodiments.

FIG. 3 is a block diagram showing a configuration of the main parts of the user terminal in the present example. The user terminal 2 includes a control unit 21, a display 22, an operation unit 23, and a communication unit 24. The user terminal 2 is an ordinary personal computer or tablet terminal.

The control unit 21 controls the operations of the units of the main body of the user terminal 2.

The display 22 displays a screen corresponding to the state of the main body of the user terminal 2. The operation unit 23 includes input devices such as a mouse, a keyboard, and a touch panel. The operation unit 23 receives an input operation by the user to the main body of the user terminal 2. The communication unit 24 performs data communication with the server device 1 connected via the network 5.

The control unit 21 of the user terminal 2 includes a hardware CPU, a memory, and other electronic circuits. The control unit 21 may also be an LSI in which the hardware CPU, the memory, and the like are integrated.

3. Operation Example

Figure 4:
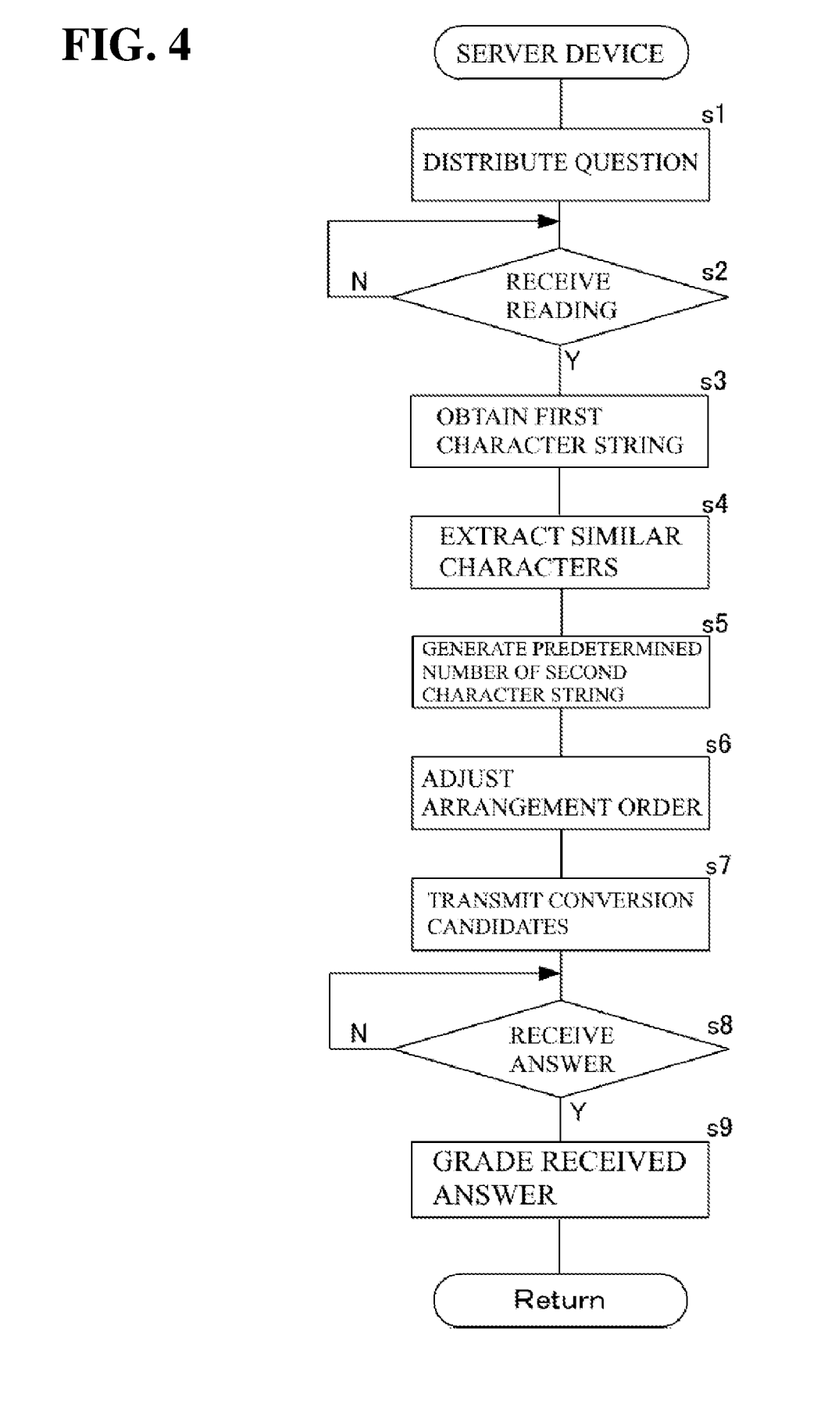
FIG. 4 is a flowchart illustrating an operation of a server device in accordance with one or more embodiments.
Figure 5:
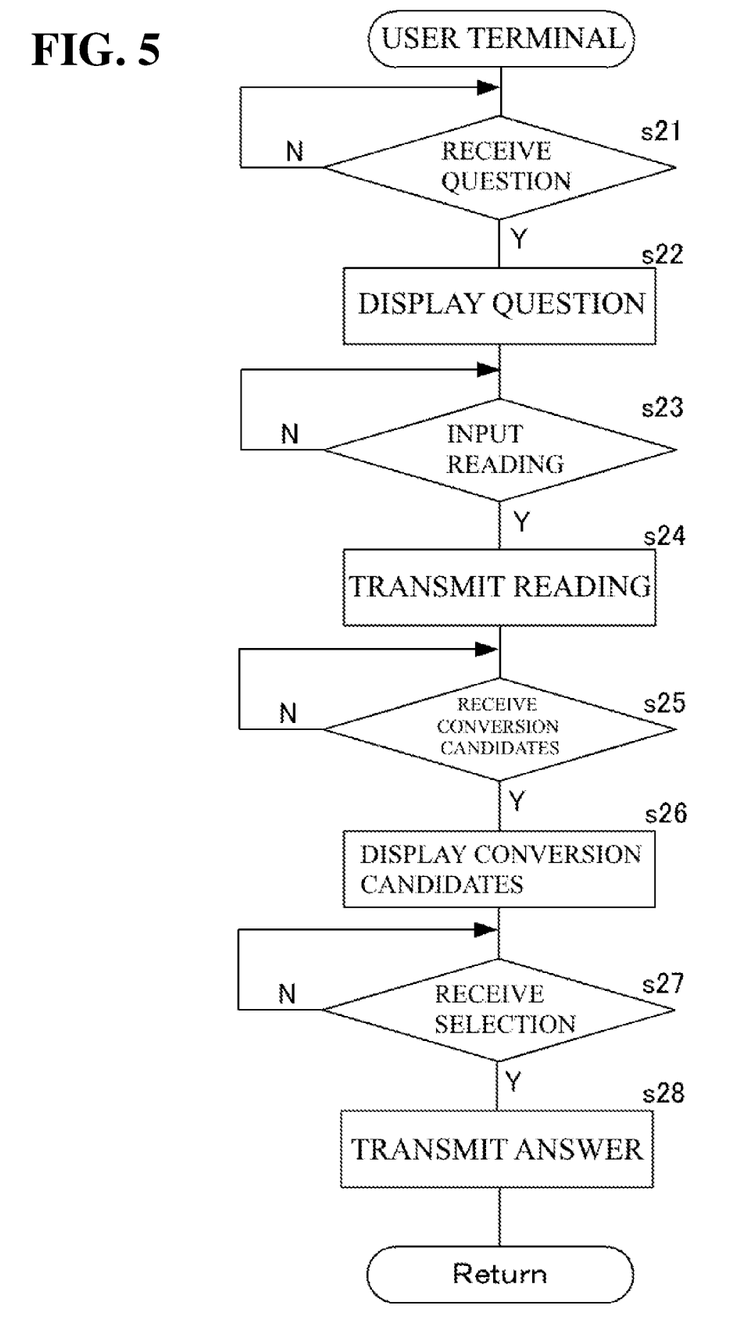
FIG. 5 is a flowchart illustrating an operation of a user terminal in accordance with one or more embodiments.

Hereinafter, the operations of the server device 1 and the user terminal 2 when a writing test is conducted using a CBT method will be described. FIG. 4 is a flowchart showing the operation of the server device, and FIG. 5 is a flowchart showing the operation of the user terminal.

The server device 1 distributes a question of a writing test from the communication unit 14 to the user terminal 2 (step s1). The question distributed from the server device 1 is received by the communication unit 24 of the user terminal 2 via the network 5. The server device 1 distributes the following question to the user terminal 2, for example.

Whose personality is described in the following Japanese tanka (short poem of seventeen kana characters)?

「鳴かぬなら鳴かせてみせよ うホトトギス」

(English translation: "If the small cuckoo does not sing for me, I will make the small cuckoo sing.", a famous Japanese tanka in seventeen kana characters; "Na-ka-nu-na-ra, na-ka-se-te-mi-se-yo, ho-to-to-gi-su")

When the communication unit 24 of the user terminal 2 receives the question distributed from the server device 1, the user terminal 2 displays the received question on its display 22 (steps s21 and s22). The user operates the input device such as the keyboard that is provided in the operation unit 23 to input the answer to the question displayed on the display 22 in the form of a kana character string (reading). The user inputs, for example, とよとみひでよし, おだのぶなが, or the like. In the present example, とよとみひでよし may lead to the correct answer, and おだのぶなが will lead to an incorrect answer.

The user terminal 2 transmits the input reading (kana character string) from the communication unit 24 to the server device 1 (steps s23 and s24). The user terminal 2 waits for receiving, from the server device 1, conversion candidates (step s25).

After distributing the question to the user terminal 2 in the above-described step s1, the server device 1 waits to receive a reading from the user terminal 2 (step s2). When the communication unit 14 of the server device 1 receives the reading transmitted from the user terminal 2 in step s24, the server device 1 obtains a first character string (step s3). If the reading that has been received in step s3 is the reading of the correct answer to the question distributed in step s1, the server device 1 obtains the Chinese character notation of the correct answer as the first character string. In contrast, if the reading that has been received in step s3 is not the reading of the correct answer to the question distributed in step s1, the server device 1 obtains the Chinese character notation of the reading received as the first character string. When the received reading is the correct answer と よとみひでよし, for example, the server device 1 obtains 豊臣秀吉, which is the correct Chinese character notation of the correct answer as the first character string. In contrast, when the received reading is おだのぶなが, which is not the correct answer, the server device 1 obtains, as the first character string, any one of 織田信長, 小田信長, and 織川信永 (all of which can be read in Japanese as "Oda Nobunaga"). When the received reading is not the correct answer, the server device 1 obtains the first character string using the dictionary DB13. The first character string obtainment unit 11a performs the process related to step s3.

The server device 1 extracts a character having a similar shape, for each character belonging to the first character string obtained in step s3 (step s4). If the first character string obtained in step s3 is 豊臣秀吉, for example, the server device 1 extracts Chinese characters having a similar shape to 豊, Chinese characters having a similar shape to 臣, Chinese characters having a similar shape to 秀, and Chinese characters having a similar shape to 吉. If the first character string obtained in step s3 is 織田信長, for example, the server device 1 extracts Chinese characters having a similar shape to 織, Chinese characters having a similar shape to 田, Chinese characters having a similar shape to 信, and Chinese characters having a similar shape to 長. The server device 1 extracts the similar characters in step s4 using the similar character DB12. The similar character extraction unit 11b performs the process in step s4.

The server device 1 generates a predetermined number of second character strings in which some or all of the characters of the first character string obtained in step s3 are replaced with characters having similar shapes extracted in step s4 (step s5). When the first character string obtained in step s3 豊臣秀吉 and the predetermined number of second character strings to be generated is five, the server device 1 generates, as the second character strings, e.g. 豊臣秀吉, 豊 臣莠占, 豊臣禿吉, 豊臣禿吉, and 豊戸秀吉. Also, when the first character string obtained in step s3 is 織田信長 and the predetermined number of second character strings to be generated is five, the server device 1 generates, as second character strings, e.g. 職田信長, 職田佔長, , 織田佔長, 織田伸長, and 職田伸長. The second character string generation unit 11c performs the process related to step s5.

The server device 1 sets the first character string obtained in step s3 and the predetermined number of second character strings generated in step s5 as conversion candidates for the answer to the question. When the user inputs an incorrect reading, the correct answer is not included in the conversion candidates of the answer to the question.

The server device 1 adjusts the arrangement order of the conversion candidates of the answer to the question (step s6). Here, the arrangement order is an order in which the conversion candidates are displayed on the display 22 of the user terminal 2. In step s6, the arrangement order of the conversion candidates is adjusted so that the location in which the correct answer is displayed randomly changes for each question. The arrangement adjustment unit 11*d* performs the process related to step s6.

The server device 1 transmits the conversion candidates of the answer to the question to the user terminal 2 that has transmitted the reading received by the server device 1 in step s2 (step s7). At the present time, the server device 1 instructs the user terminal 2 to display the conversion candidates of the answer to the question in the arrangement order adjusted in step s6.

When the communication unit 24 of the user terminal 2 receives the conversion candidates for the answer to the question, the user terminal 2 displays the received conversion candidates on its display 22 in the order instructed by the server device 1 (steps s25 and s26). When the user terminal 2 receives an operation of selecting one of the conversion candidates displayed on the display 22 through the operation unit 23, the user terminal 2 transmits the selected conversion candidate to the server device 1 as the answer to the question (steps s27 and s28), and then returns to the process in step s21.

Upon receiving the answer from the user terminal 2, the server device 1 grades the answer (steps s8 and s9), and then returns to the process in step s1.

Therefore, in the above-described network system, if the user incorrectly remembers the Chinese character notation of the reading that was input to the user terminal 2, then the user may select the correct conversion candidate by chance, but in most cases, the user will select an incorrect conversion candidate. Therefore, when the writing test is conducted using a CBT method, it is possible to appropriately determine and evaluate the knowledge, ability, and the like of the user who takes the test.

In addition, in the network system of the present example, the user does not input the answer by handwriting, thus the user's knowledge, ability, and the like are not erroneously determined and evaluated depending on the recognition accuracy of characters input by handwriting. Furthermore, the user does not need to prepare a tablet that can receive handwriting input.

In the above description, the server device 1 distributes questions one by one to the user terminal 2. However, the server device 1 may also be configured to distribute a plurality of questions at the same time to the user terminal 2, and to receive a reading and an answer for each question from the user terminal 2.

4. Modified Examples

The control unit 21 of the user terminal 2 may also be provided with the configuration related to the first character string obtainment unit 11*a*, the similar character extraction unit 11*b*, the second character string generation unit 11*c*, the arrangement adjustment unit 11*d*, and the grading unit 11*e* that are included in the control unit 11 of the server device 1 described in the above example. With the above-described configuration, the user terminal can also be used as a learning terminal on which a user performs preliminary learning and review.

In the above example, the similar character extraction unit 11*b* is configured to extract, from existing Chinese characters, a Chinese character similar in shape to a Chinese character used in an answer to a question. However, for example, the similar character extraction unit 11*b* may also be configured to extract Chinese characters that are obtained by changing a part of a Chinese character used in the correct Chinese character notation as a character having a similar shape (the generated Chinese character may also be a non-existing Chinese character).

One or more embodiments may be applicable to a writing test of all types of test and a writing test of all subjects that are conducted using a CBT method.

One or more embodiments may not be limited to the above-described embodiment. One or more embodiments may be embodied by modifying the constituent elements without departing from the scope. Furthermore, various inventions may be formed by appropriately combining a plurality of constituent elements disclosed in the above embodiments. Some constituent elements may be deleted from all the constituent elements shown in one or more embodiments, for example. Furthermore, the constituent elements of different embodiments may also be combined as appropriate.

The correspondence relationship between the configuration according to one or more embodiments and the configuration according to the above-described embodiment may be described as the following supplementary note.

Supplementary Note

A character input device (1) including:
- a first character string obtainment unit (11*a*) configured to obtain a first character string in response to an input character string that has been input;
- a similar character extraction unit (11*b*) configured to extract similar characters having similar shapes for characters belonging to the first character string;
- a second character string generation unit (11*c*) configured to generate a second character string in which some or all of the characters belonging to the first character string are replaced with the similar characters extracted by the similar character extraction unit; and
- a conversion candidate output unit (14) configured to output the first character string and the second character string as conversion candidates for the input character string.

LIST OF REFERENCE NUMERALS

1 Server device
2 User terminal
5 Network
11 Control unit
11*a* First character string obtainment unit
11*b* Similar character extraction unit
11*c* Second character string generation unit
11*d* Arrangement adjustment unit
11*e* Grading unit
12 Similar character database (Similar character DB)
13 Dictionary database (Dictionary DB)
14 Communication unit
21 Control unit 22 Display
23 Operation unit
24 Communication unit

The invention claimed is:

1. A character input device comprising a processor configured with a program to perform operations comprising:
    operation as a first character string obtainment unit configured to obtain a first character string in a first character notation in response to an input character string that has been input in a second character notation in response to a presented question of a writing test presented in the first character notation or a combination of the first character notation and the second character notation;
    operation as a similar character extraction unit configured to extract similar characters of the first notation having similar shapes as characters in the first character string;
    operation as a second character string generation unit configured to generate one or more second character strings of the first notation in which some or all of the characters in the first character string are replaced with the similar characters extracted by the similar character extraction unit; and
    operation as a conversion candidate output unit configured to output the first character string and the generated one of more second character strings as conversion candidates for the input character string, each of the conversion candidates output as a candidate answer to the presented question.

2. The character input device according to claim 1, wherein the processor is configured with the program to perform operations further comprising:
    operation as an arrangement adjustment unit configured to adjust an arrangement order of the first character string and the generated one of more second character strings that are output from the conversion candidate output unit as the conversion candidates for the input character string.

3. The character input device according to claim 1,
    wherein the processor is configured with the program to perform operations such that operation as the first character string obtainment unit comprises obtaining a predetermined character string as the first character string if the input character string is a specified character string, and obtaining a character string whose reading is the same as that of the input character string as the first character string if the input character string is not the specified character string.

4. The character input device according to claim 1, wherein the processor is configured with the program to perform operations further comprising:
    operation as a grading unit configured to grade, as a correct or an incorrect answer, a conversion candidate selected from the conversion candidates that have been output from the conversion candidate output unit.

5. A character input method in which a computer executes, comprising:
    obtaining a first character string in a first character notation in response to an input character string that has been input in a second character notation in response to a presented question of a writing test presented in the first character notation or a combination of the first character notation and the second character notation;
    extracting similar characters of the first notation having similar shapes as characters in the first character string;
    generating one or more second character strings of the first notation in which some or all of the characters in the first character string are replaced with the similar characters extracted in the extracting similar characters; and
    outputting the first character string and the generated one of more second character strings as conversion candidates for the input character string, each of the conversion candidates output as a candidate answer to the presented question.

6. A non-transitory computer-readable storage medium storing a character input program, which when read and executed, causes a computer to perform operations comprising:
    obtaining a first character string in a first character notation in response to an input character string that has been input in a second character notation in response to a presented question of a writing test presented in the first character notation or a combination of the first character notation and the second character notation;
    extracting similar characters of the first notation having similar shapes as characters in the first character string;
    generating one or more second character strings of the first notation in which some or all of the characters in the first character string are replaced with the similar characters extracted in the extracting similar characters; and
    outputting the first character string and the generated one of more second character strings as conversion candidates for the input character string, each of the conversion candidates output as a candidate answer to the presented question.

7. The character input device according to claim 1, wherein the processor is configured with the program to perform operations such that operation as the first character string obtainment unit comprises obtaining character strings in Japanese or Chinese script.

8. The character input device according to claim 2,
    wherein the processor is configured with the program to perform operations such that operation as the first character string obtainment unit comprises obtaining a predetermined character string as the first character string if the input character string is a specified character string, and obtaining a character string whose reading is the same as that of the input character string as the first character string if the input character string is not the specified character string.

9. The character input device according to claim 2, wherein the processor is configured with the program to perform operations further comprising:
    operation as a grading unit configured to grade, as a correct or an incorrect answer, a conversion candidate selected from the conversion candidates that have been output from the conversion candidate output unit.

10. The character input device according to claim 3, wherein the processor is configured with the program to perform operations further comprising:
    operation as a grading unit configured to grade, as a correct or an incorrect answer, a conversion candidate selected from the conversion candidates that have been output from the conversion candidate output unit.

11. The character input device according to claim 8, wherein the processor is configured with the program to perform operations further comprising:
    a grading unit configured to grade, as an answer, a conversion candidate selected from the conversion candidates that have been output from the conversion candidate output unit.

12. The character input device according to claim 2, wherein the processor is configured with the program to perform operations such that operation as the first character string obtainment unit comprising obtaining character strings in Japanese or Chinese script.

13. The character input device according to claim 8, wherein the processor is configured with the program to perform operations such that operation as the first character string obtainment unit comprising obtaining character strings in Japanese or Chinese script.

14. The character input device according to claim 9, wherein the processor is configured with the program to perform operations such that operation as the first character string obtainment unit comprising obtaining character strings in Japanese or Chinese script.

15. The character input device according to claim 11, wherein the processor is configured with the program to perform operations such that operation as the first character string obtainment unit comprising obtaining character strings in Japanese or Chinese script.

16. The character input device according to claim 3, wherein the processor is configured with the program to perform operations such that operation as the first character string obtainment unit comprising obtaining character strings in Japanese or Chinese script.

17. The character input device according to claim 10, wherein the processor is configured with the program to perform operations such that operation as the first character string obtainment unit comprising obtaining character strings in Japanese or Chinese script.

18. The character input device according to claim 4, wherein the processor is configured with the program to perform operations such that operation as the first character string obtainment unit comprising obtaining character strings in Japanese or Chinese script.

* * * * *